United States Patent [19]

Buches, Jr.

[11] Patent Number: 5,781,722
[45] Date of Patent: Jul. 14, 1998

[54] METHOD FOR DIAGNOSIS AND REPAIR OF COMPRESSED VOLUMES UTILIZING A BITMAP

[75] Inventor: David M. Buches, Jr., Woodland Hills, Calif.

[73] Assignee: Symantec Corporation, Cupertino, Calif.

[21] Appl. No.: 643,310

[22] Filed: May 10, 1996

[51] Int. Cl.[6] .......................... G06F 13/00; G06F 12/00
[52] U.S. Cl. ........................... 395/185.07; 395/621
[58] Field of Search ........................... 395/185.07, 616, 395/621; 382/235

[56] References Cited

U.S. PATENT DOCUMENTS

| | | | |
|---|---|---|---|
| 5,111,444 | 5/1992 | Fukushima et al. | 369/58 |
| 5,394,534 | 2/1995 | Kulakowski et al. | 395/425 |
| 5,410,671 | 4/1995 | Elgamal et al. | 395/425 |
| 5,481,701 | 1/1996 | Chambers, IV | 395/600 |
| 5,574,907 | 11/1996 | Jernigan, IV et al. | 395/601 |
| 5,640,592 | 6/1997 | Rao | 395/825 |

Primary Examiner—Robert W. Beausoliel, Jr.
Assistant Examiner—Norman M. Wright
Attorney, Agent, or Firm—Fenwick & West LLP

[57] ABSTRACT

A diagnostic module (210) diagnoses defective compressed volume files (CVFs) stored on disks (200) in computer systems. A compressed file allocation table (CFAT) (206) has, for each CVF, an entry that indicates the starting sector of the cluster, the length, and flags indicative of whether the CVF is fragmented or compressed. Each entry in the CFAT (206) is checked, and, if an error is found, the error is recorded in an error table (214). A bit file allocation table (FAT) (202) is a data structure having a bit for each sector in the data region of a CVF. A bit of the bit FAT (202) is set by the diagnostic module (210) to indicate that the associated sector is being used by an entry in the CFAT (206). A repair module (212) is executed that repairs the entries in the CFAT (206) that have errors, typically by clearing the entry. The diagnostics module (210) is rerun and the bit FAT (202) is recreated. The bit FAT (202) is recorded on the disk (200). The operating system uses the recreated bit FAT (202) and the CFAT (206) during operation to track locations of data on the disk (200) and the sectors being used.

8 Claims, 8 Drawing Sheets

METHOD FOR DIAGNOSIS AND REPAIR OF COMPRESSED VOLUMES UTILIZING A BITMAP

FIELD OF THE INVENTION

The present invention pertains to diagnosing and repairing defective data in computer systems that have a file allocation table (FAT) structure and that use compressed volume files (CVFs).

BACKGROUND OF THE INVENTION

In a computer system, data may be stored on a hard disk drive in a compressed format. A software driver loads the compressed file and simulates the hard disk. The operating system interfaces with the software driver, which appears to the operating system as a hard disk. An example of such software for compressed data is DriveSpace, produced by Microsoft of Redmond, Washington.

Diagnostic software repairs compressed data drives by performing a diagnostic test of the disk and then performing a repair procedure to correct defective sectors of the disk. An example of such diagnostic software is Scandisk, manufactured by Microsoft of Redmond, Washington, which repairs DriveSpace compressed volumes.

Errors in the size of the compressed data may cause the computer to halt. Such errors are not currently detected by diagnostic software. It is desirable to detect errors in the size of the compressed data.

PC type computers use a bit file allocation table to track sectors of the disk that are being used. The diagnostic software tests a compressed file allocation table that relates compressed data to sectors on the disk. If an entry in the compressed file allocation table fails a diagnostic test, the diagnostic software deletes the entry from the compressed file allocation table. However, some sectors may be usable, but the system does not use these sectors, because the bit file allocation table indicates that the sector is being used.

SUMMARY OF THE INVENTION

In the present invention, a diagnostic module (210) diagnoses defective compressed volume files (CVFs) stored on a recording medium, such as a disk (200). A compressed file allocation table (CFAT) (206) has, for each CVF, an entry that indicates the starting sector (404) of a compressed cluster, the length (406), and flags (408, 410) indicative of whether the cluster is fragmented or compressed. Each entry in the CFAT (206) is analyzed, and, if error is found, the error is recorded in an error table (214). A bit file allocation table (FAT) (202) is a data structure having a bit for each sector in the data region of a CVF. A bit of the bit FAT (202) is set by the diagnostic module (210) if the analysis of the entry is indicative of a valid entry. A valid entry in the CFAT (206) indicates that the associated sector is being used by the entry. A repair module that repairs the entries in the CFAT (206) that are invalid or have errors is executed, typically by clearing the entry. The diagnostics module (210) is rerun to reanalyze each entry in the CFAT (206). The bit FAT (202) is recreated by resetting a bit in the bit FAT (202) if the reanalysis of the entry is indicative of a valid entry. The bit FAT (202) is recorded on the disk. The operating system uses the recreated bit FAT (202) and the CFAT (206) during operation to track locations of data on the disk and the sectors being used.

In another method, errors are diagnosed in the compressed volume files recorded on a recording medium (200). An entry from a compressed file allocation table (206) is retrieved. An entry from a DOS file allocation table (204) corresponding to the retrieved entry from the compressed file allocation table (206) is read. An error is recorded if the read entry from the DOS file allocation table (204) indicates an associated portion of the recording medium (200) is defective. If the compressed size of data associated with the entry and recorded on the recording medium (200) is determined to be greater than the uncompressed size of said data, an error is recorded.

An entry is retrieved from a compressed file allocation table (206). An error is recorded if the compressed size of the data associated with the entry is determined to be greater than the uncompressed size of said data.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
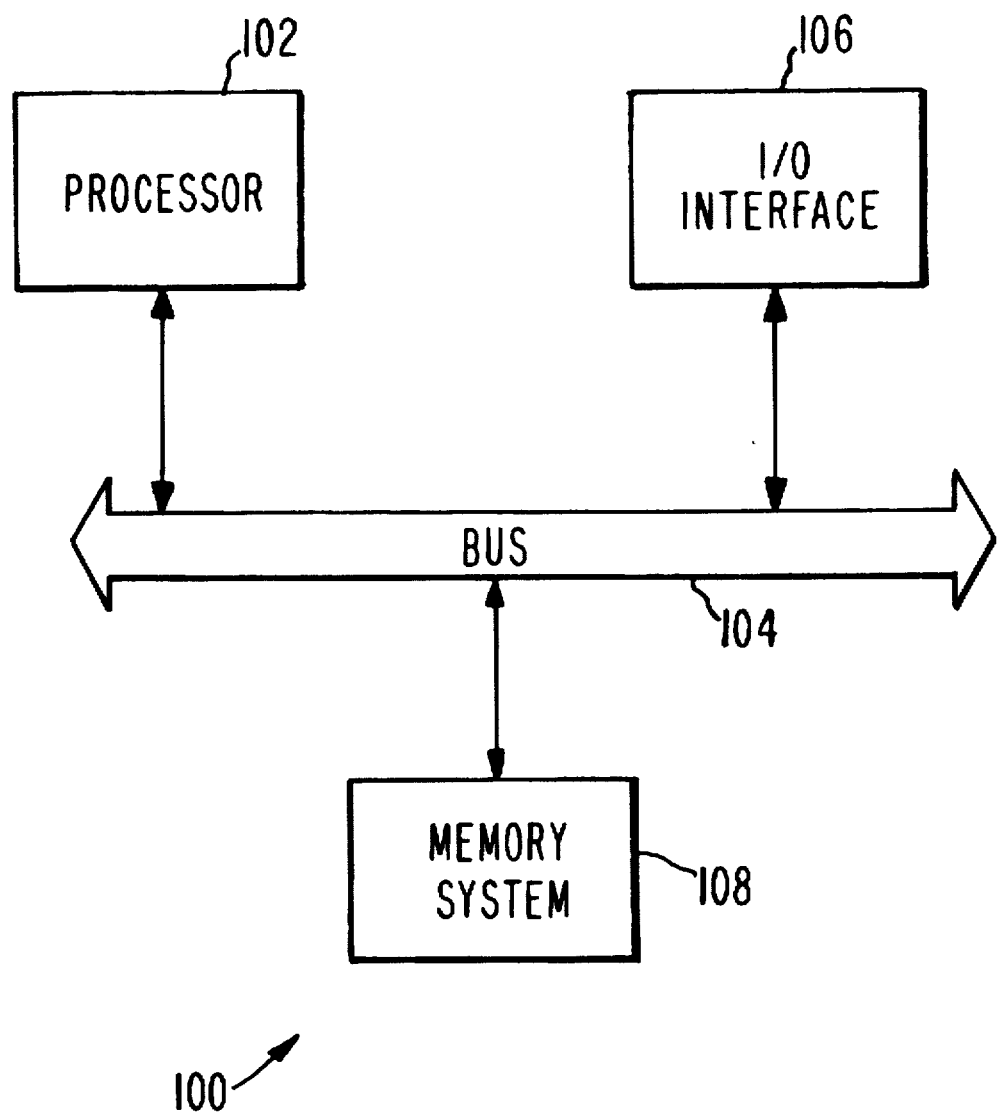
FIG. 1 is a block diagram illustrating a computer system 100 in accordance with the present invention.

Referring to FIG. 1, there is shown a block diagram illustrating a computer system 100 in accordance with the present invention. The computer system 100 includes a processor 102, a bus 104, an input/output (I/O) interface 106, and a memory system 108. The processor 102 may be, for example, a Pentium (TM) processor manufactured by Intel Corporation of Santa Clara, Calif. The bus 104 may be, for example, a Peripheral Components Interconnection (PCI) bus. The operation of the processor 102, the bus 104, and the I/O interface 106 is well known. The processor 102 executes programs stored in the memory system 108 as described later herein.

Figure 2:
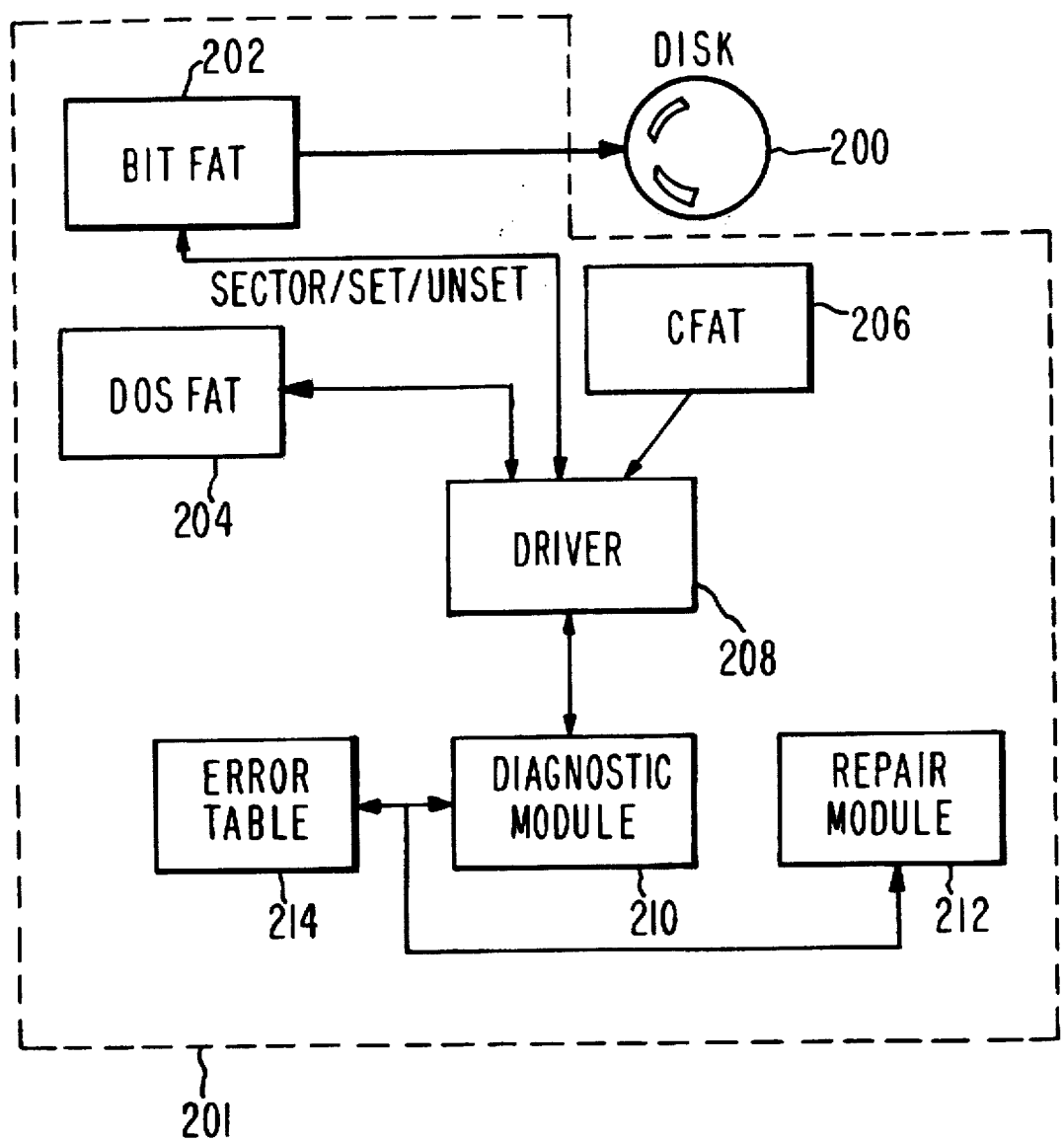
FIG. 2 is an illustration of the memory system 108 of the computer system 100 of FIG. 1.

Referring to FIG. 2, there is shown an illustration of the memory system 108, which includes computer-readable storage media, specifically a disk 200 and a program memory 201. During system operation, the program memory 201 stores a bit file allocation table (bit FAT) 202, a DOS file allocation table (DOS FAT) 204, a compressed file allocation table (CFAT) 206, a software driver 208, a diagnostic module 210, a repair module 212, and an error table 214. Of course, the disk 200 provides nonvolatile storage for the same. The disk 200 is arranged in a conventional track format with each track containing a plurality of sectors. Data is arranged in compressed volume files (CVFs) and stored in at least one sector. A cluster is the smallest unit of data readable from the disk by the operating system. A cluster may be recorded on one or more sectors of the disk 200. In compressed data systems, the data stored in a cluster is compressed in a conventional manner.

The bit FAT 202 is a data structure containing a bit for each sector in the data region of a CVF. The DOS FAT 204 is a file allocation table having entries that indicate whether sectors on the disk 200 are usable.

Figure 3:
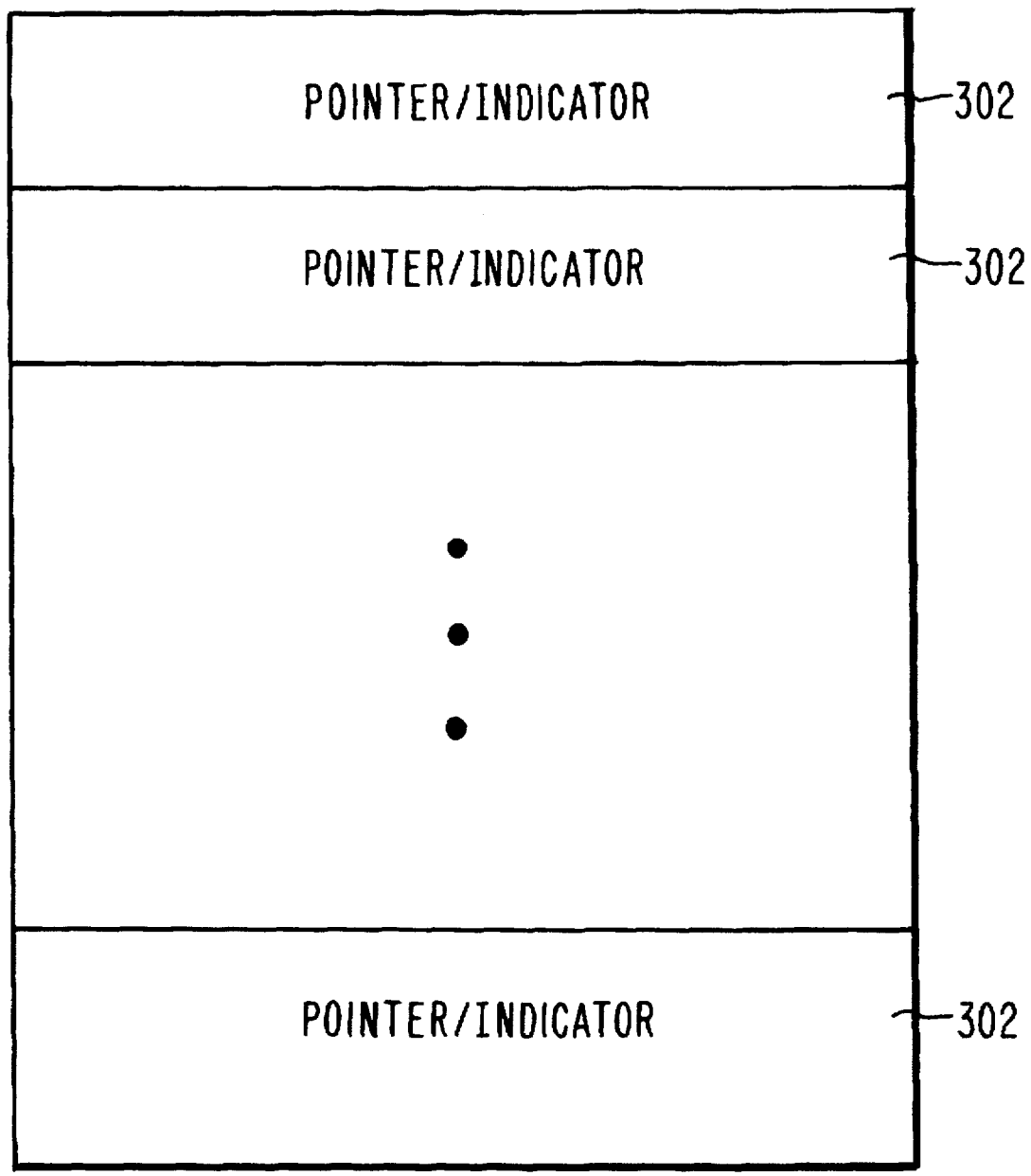
FIG. 3 is an illustration of a DOS file allocation table (DOS FAT) 204 of the memory of FIG. 2.

Referring to FIG. 3, there is shown an illustration of the DOS FAT 204. The DOS FAT 204 includes a pointer/indicator 302 for each cluster on the disk 200. The pointer/indicator 302 points to the next cluster to be read, or if the cluster bad, indicates such. A cluster may be unusable if the physical sector on the disk 200 is defective.

Referring again to FIG. 2, the CFAT 206 is a file allocation table for compressed volume files. The CFAT 206 includes data about where the user data is actually located in the compressed volume file. The CFAT 206 has entries indicating the sectors of the disk 200 being used for each CVF. There is a one to one correspondence between an entry in the CFAT 206 and an entry in the DOS FAT 204.

Figures 4, 5:
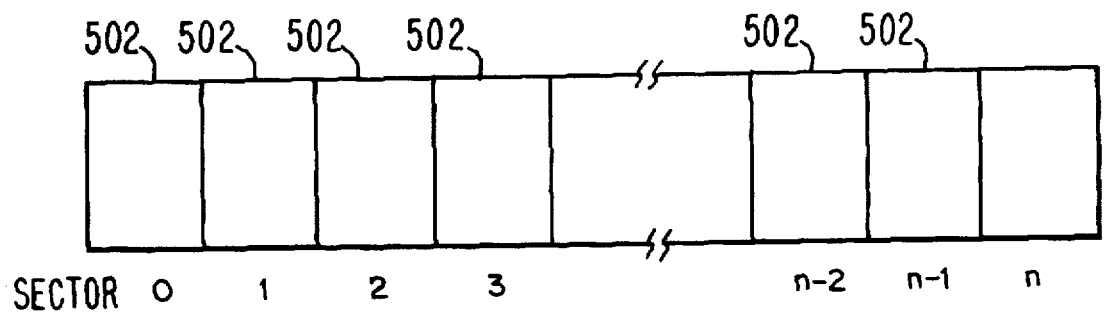
FIG. 4 is an illustration of a compressed file allocation table (CFAT) 206 of the memory of FIG. 2.
FIG. 5 is an illustration of a bit file allocation table (bit FAT) 202 of the memory of FIG. 2.

Referring to FIG. 4, there is shown an illustration of the CFAT 206. For each cluster, the CFAT 206 includes an identifier 402, a starting sector 404, a length 406 of the data (typically in sectors), a fragmented flag 408, and a compressed flag 410. The identifier 402 identifies the compressed cluster on the disk 200. The starting sector 404 is the offset in the file to where the corresponding data is on the disk 200. The fragmented flag 408 indicates whether the cluster is stored in noncontiguous or fragmented clusters on the disk 200. If the fragmented flag 408 is set, the entry in the CFAT 206 also includes an extent header that indicates the number of fragments and the location or sector of each fragment, and also includes data. The first entry in the extent header points to itself, because data is stored in any remaining space in the cluster. The compressed flag 410 indicates whether the data in the cluster is compressed. If the compressed flag 410 is set (i.e. the data is compressed), the CFAT entry includes the length 412 of the compressed data.

Referring again to FIG. 2, the software driver 208, the diagnostic module 210, and the repair module 212 are stored on the disk 200 and retrieved to the program memory 201 at system power up or boot up. The processor 102 executes the software driver 208, the diagnostic module 210, and the repair module 212. The software driver 208 provides an interface between the operating system and the disk 200. The diagnostic module 210 tests each entry of the CFAT 206 to determine whether the sectors used for the associated data are usable and available, whether the identification of the sectors used for the data is correct, and, if the data is fragmented, whether the fragmentation is correct. The repair module 212 repairs CFAT entries that are defective or clears the entry to prevent use of the entry. The error table 214 stores a list of defective CFAT entries and the type of error detected for the entry. A user may retrieve the data in the error table 214 which explains to the user what errors found by the diagnostic module 210 and how to fix them.

Referring to FIG. 5, there is shown an illustration of the bit FAT 202, which includes a plurality of bits 502. Each bit 502 of the bit FAT 202 corresponds to a sector in the data region of a CVF. A bit of the bit FAT 202 is set if the sector corresponding to that bit has been assigned to a CVF. The bit is set if the associated sector is being used for storing a CVF.

Figure 6A:
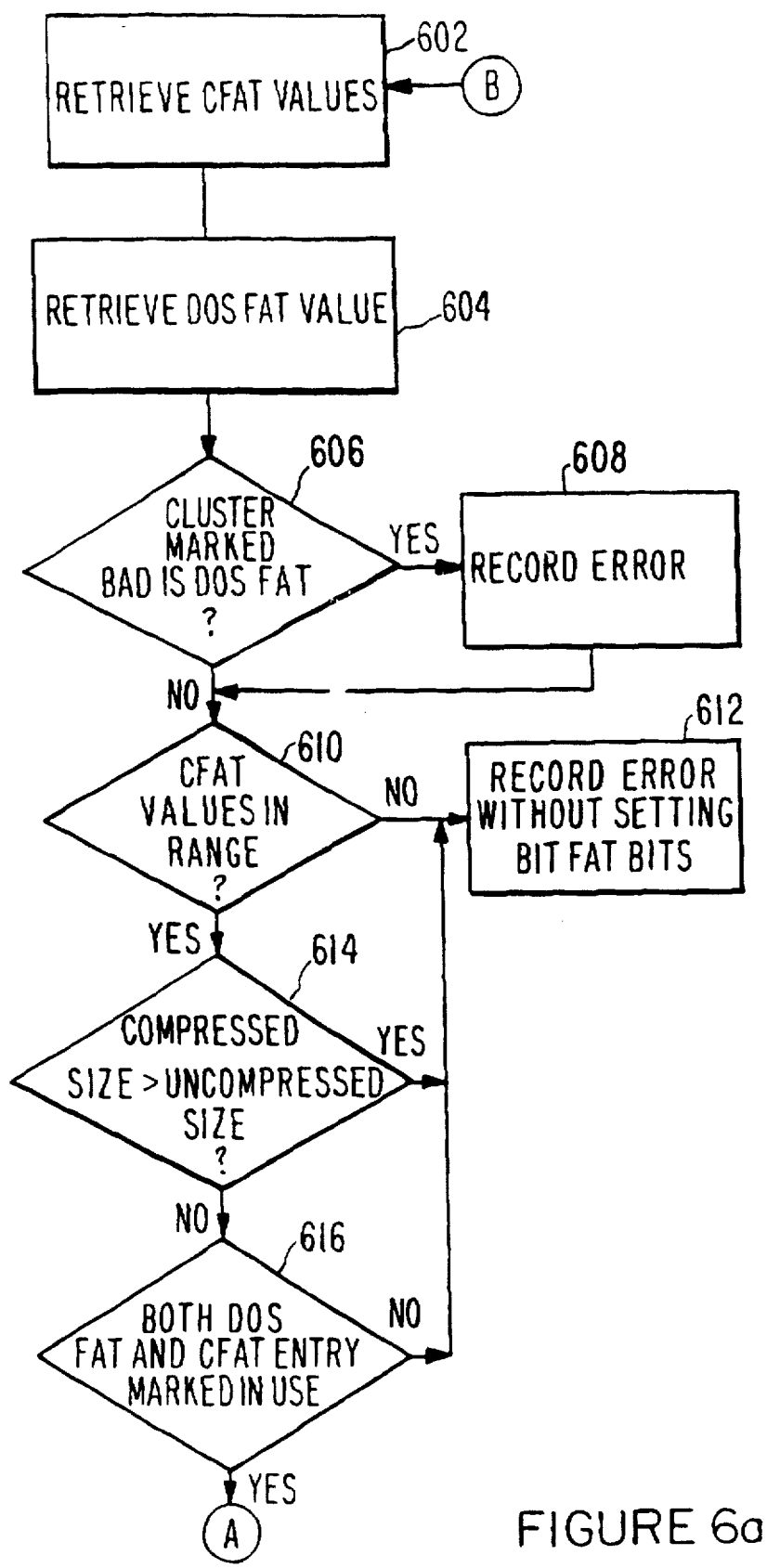
FIGS. 6a–6b are flow charts illustrating the operation of the diagnostic routine 210.
Figure 6B:
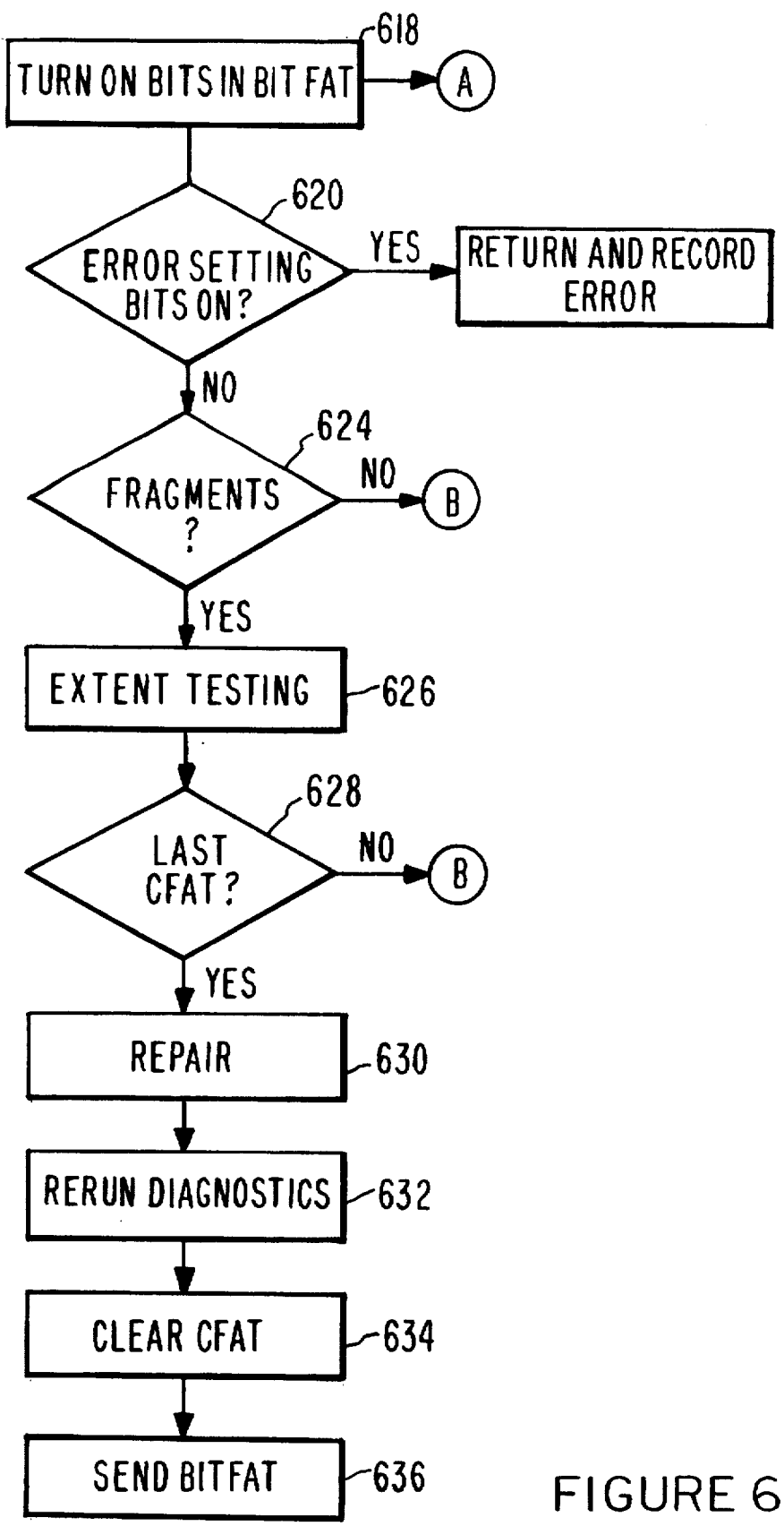

Referring to FIGS. 6a–6b, there are shown flowcharts illustrating the operation of the diagnostic module 210. The diagnostic module 210 checks each cluster on the disk 200 to determine whether the cluster corresponds to a bad sector on the disk 200 or whether the entry in the cluster points to incorrect sectors.

For an entry in the CFAT 206, the CFAT values are retrieved 602 from the CFAT 206. The DOS FAT value associated with such CFAT entry is retrieved 604 from the DOS FAT 204. The diagnostic module 210 determines 606 whether the cluster is marked in the DOS FAT 204 as being nonusable or bad. The DOS FAT 204 should not include any bad entries on compressed volumes. If a cluster is marked bad, the diagnostic module 210 records 608 an error in the error table 214. Whether or not a cluster is bad, the diagnostic module 210 continues the test by determining 610 whether the CFAT values are in a proper range. An error occurs if the entry indicates that the cluster starts before the starting sector or is longer than the maximum allowable length. In particular, the diagnostic module 210 determines if the compressed sector count is within a predetermined range, such as non zero or less than the size of a cluster. In addition, the diagnostic module 210 validates the starting sector for the CFAT entry by determining whether the starting sector is less than the largest possible sector in the CVF. If the CFAT values are not in the proper range, the diagnostic module 210 records 612 an error in the error table 214 without setting the bits of the bit FAT 202.

Otherwise, the diagnostic module 210 determines 614 whether the compressed size of the volume is greater than the uncompressed size. In some commercially available software for compressed volume files, such as DriveSpace by Microsoft, the number of compressed sectors is greater than the number of uncompressed sectors. Such a condition may cause data loss or corruption. If the compressed size is greater than the uncompressed size, the diagnostic module 210 returns and records 612 an error in the error table 214 without setting any bits in the bit FAT 202.

Otherwise, the diagnostic module 210 determines 616 whether both the DOS FAT entry and the CFAT entry are marked in use. If not, the CFAT entry is a wasted entry if the DOS FAT entry is not in use. In this case, the CFAT entry is cleared and becomes available for use for other clusters.

The diagnostic module 210 turns on 618 the bits of the bit FAT 202 corresponding to the sectors used by the CFAT entry. If the diagnostics tests are passed, the turning on of bits in the bit FAT 202 reserves sectors for the CFAT entry. For example, say a CFAT entry indicates that a cluster of data starts at sector 10 (the starting sector 404 of the CFAT entry indicates such) and is 15 sectors long (the length 406 of the CFAT entry indicates such). The diagnostic module 210 sets the bits of the bit FAT 202 corresponding to sectors 10 through 24. Of course, if the cluster is fragmented, the sectors are not sectors 10 through 24 and the bits corresponding to the 15 fragmented sectors of the CFAT entry are set. If any errors occur 620 while setting the bits on, the diagnostic module 210 returns and records 622 an error in the error table 214. An error occurs if the bit was previously set. A crosslink error is an error where the starting sector of a CFAT entry has been used by another CFAT entry. A range error is an error where the length of a CFAT entry is incorrect. Such an error occurs when the bits of the bit FAT 202 are being set and the bit being set has previously been set. Here a crosslink or a range error may have occurred.

The diagnostic module 210 determines 624 whether the CFAT entry includes fragments. If not, the diagnostic module 210 returns to retrieving 602 the CFAT values from the CFAT 206, as described above. Otherwise, the diagnostic module 210 tests 628 the extents.

Figure 7:
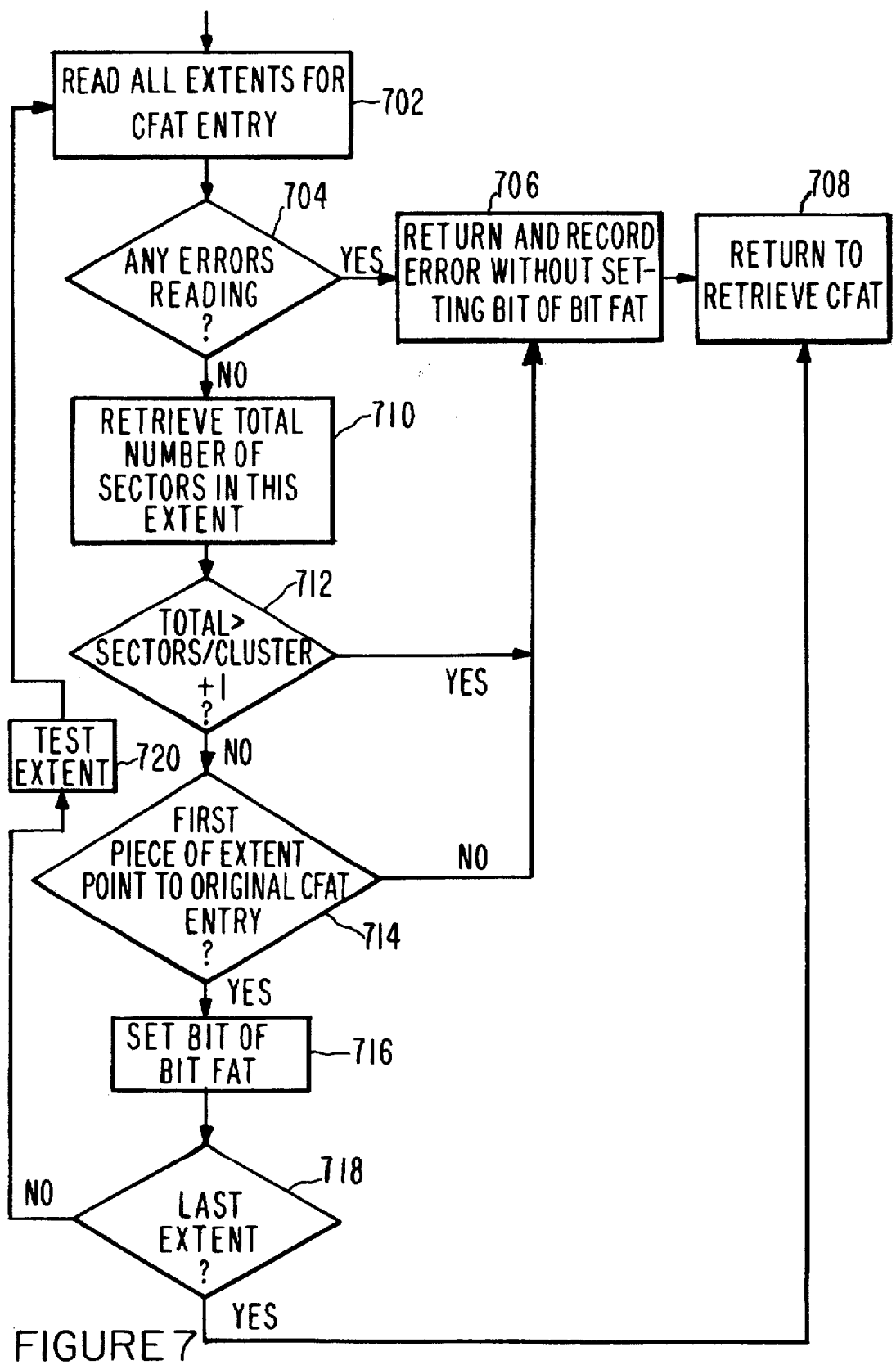
FIG. 7 is a flowchart illustrating the testing of the extents.

Referring to FIG. 7, there is shown a flowchart illustrating the testing of the extents. The diagnostic module 210 reads 702 all extents for the CFAT entry, and determines 704 whether any errors in reading the extents occurred. If an error occurred, the diagnostic module 210 returns and records 706 an error in the error table 214 without setting any bits in the bit FAT 202. The diagnostic module 210 returns 708 to retrieving the CFAT 206 as described above.

Otherwise, if no errors occurred in reading the extents, the diagnostic module 210 diagnoses 710 the total number of sectors for the extent. The diagnostic module 210 determines 712 whether the total number of extents is greater than the number of sectors per cluster plus one. The fragmented clusters may not be greater then the maximum clusters allowed by the operating system. If the total number of extents is greater, the diagnostic module 210 returns and records 706 an error in the error table 214 without setting any bits in the bit FAT 202. Otherwise, the diagnostic module 210 determines 714 whether the first entry of the extent points to the original CFAT entry. In some software, such as DriveSpace 3 volumes, the first piece of the extent refers to the original CFAT entry. If the first piece of the extent does not point to the original CFAT entry, the diagnostic module 210 returns and records 706 an error in the error table 214 without setting a bit of the bit FAT 202, as described above.

On the other hand, if the first piece of the extent does point to the original CFAT entry, the diagnostic module 210 sets 716 the bit of the bit FAT 202 corresponding to the CFAT entry. If 718 the extent is not the last extent, the diagnostic module 210 tests 720 the extent by determining 610 whether the extent is in the proper range, determining 614 whether the compressed size of the extent is greater than the uncompressed size, turning on 618 the bits in the bit FAT 202 that are associated with the extent, and detecting 620 errors in turning on the bits. The error is recorded in the error table 214. The bits in the bit FAT 202 are not set. Otherwise, if 618 the extent is the last extent, the diagnostic module 210 returns 708 to retrieving the CFAT as described above.

Referring again to FIG. 6b, upon completing the extent testing 626, the diagnostic module 210 determines 628 whether the CFAT entry that was evaluated is the last CFAT entry. If not, the diagnostic module 210 returns to retrieving the next CFAT value from the CFAT 206, as described above. Otherwise, the diagnostic module 210 executes 630 the repair module 212.

Figure 8:
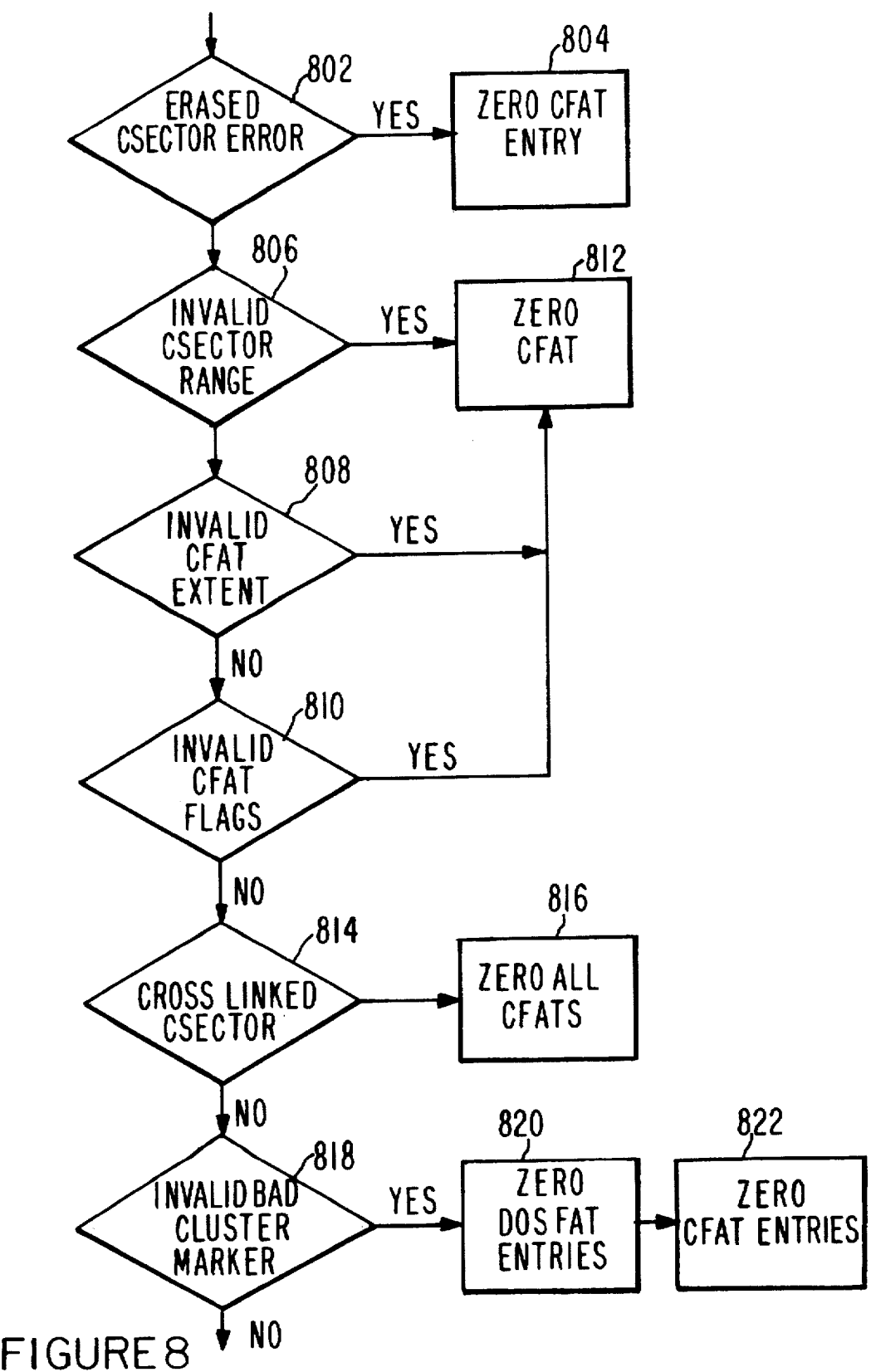
FIG. 8 is a flowchart illustrating the operation of the repair module 212 of the diagnostic routine 210 of FIG. 6.

Referring to FIG. 8, there is shown a flowchart illustrating the operation of the repair module 212. For each error in the error table 214, the repair module 212 determines whether an error occurred and, if one has, executes a repair procedure. The repair procedure typically marks the CFAT entry so that it is not used.

More specifically, if the CFAT entry indicates 802 an erased Compressed sector (Csector) error, the repair module 212 clears 804 the CFAT entry by setting it to zero. If the CFAT entry indicates 806 an invalid sector, indicates 808 an invalid CFAT extent error, or indicates 810 an invalid CFAT flag error, the repair module 212 clears 812 the associated entry in the CFAT 206 by setting the entry to zero. If the CFAT entry indicates 814 a cross-linked compressed sector, the repair module 212 clears 816 the CFAT entries associated with the cross linked sectors by zeroing all such entries. If the CFAT entry indicates 818 an invalid bad cluster marker, the repair module 212 clears 820 the associated entry in the DOS FAT 204 by zeroing the entry and clears 822 the entry in the CFAT 206 by zeroing the entry.

Referring again to FIG. 6b, each entry in the CFAT 206 has been analyzed and repaired. Upon completing the repair 630, the diagnostic module 210 reanalyzes each entry of the CFAT 206 by rerunning 632 the diagnostic tests 602 through 628, described above. In the rerun 632, the diagnostic module 210 recreates the bit FAT 202 by resetting bits corresponding to sectors that are now available because of cleared CFAT entries or are not longer available because of unrepairable errors. The diagnostic module 210 clears 634 the CFAT 206 and sends 636 the Bit FAT 202 to the disk 200. The operating system uses the recreated bit FAT 202 and the CFAT 202 during operation to track locations of data on the disk 200 and the sectors being used.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A method for diagnosing errors in compressed volume files recorded on a recording medium, the method comprising the steps of:

analyzing each entry in a compressed file allocation table for at least one invalid condition, said invalid condition being from the group of invalid conditions comprising a first invalid condition indicative of a range error in said entry, and a second invalid condition indicative of a cross-link error between at least two of said entries, said entry being indicative of a corresponding compressed volume file on the recording medium;

setting a bit in a bit file allocation table when the analysis of said entry is indicative of a valid entry, the bit being indicative of a sector of the recording medium corresponding to a location of said compressed volume file on the recording medium;

repairing an entry of the compressed file allocation table when said analyzing is indicative of an invalid entry;

reanalyzing each entry in the compressed file allocation table; and resetting a bit in the bit file allocation table when the reanalysis of said entry is indicative of a valid entry.

2. The method of 1 further comprising the steps of:

retrieving an entry from a compressed file allocation table;

reading an entry from a DOS file allocation table corresponding to the retrieved entry from the compressed file allocation table; and recording an error when the read entry from the DOS file allocation table indicates an associate portion of the recording medium is defective.

3. The method of claim 2 further comprising the steps of:

determining whether the compressed size of data associated with the entry and recorded on the recording medium is greater than the uncompressed size of said data; and recording an error when the compressed size of said data is greater than the uncompressed size of said data.

4. The method of claim 1 further comprising:

analyzing each entry in the compressed file allocation table for data fragmentation;

reading extents for each entry corresponding to fragmented data;

testing said extents for at least one invalid condition, said invalid condition being from the group of invalid conditions comprising a first invalid condition indicative of a read error in said entry, a second invalid condition indicative of a range error, and a third invalid condition indicative of a cross-link error between at least two of said entries; and recording said invalid conditions.

5. The method of claim 1, wherein the step of setting a bit in a bit file allocation table includes recording an error when said bit was previously set.

6. A computer apparatus comprising:

a processor;

a first storage medium, coupled to the processor, containing compressed volume files; and a second storage medium coupled to the processor, including:

a compressed file allocation table having a plurality of entries, each entry being indicative of a corresponding compressed volume file, a bit file allocation table having a plurality of bits, each bit being indicative of a portion of the first storage medium corresponding to a location of said compressed volume file in the first storage medium, and a repair module executable by the processor for repairing an entry of the compressed file allocation table when an analysis is indicative of an invalid entry, and a diagnostic module executable by the processor for detecting in each entry at least one invalid condition, said invalid condition being from the group of invalid conditions comprising a first invalid condition indicative of a range error in said entry, and a second invalid condition indicative of a cross-link error between at least two of said entries, for setting a bit in the bit file allocation table when the analysis of said entry is indicative of a valid entry, for performing a reanalysis of each entry in the compressed file allocation table, and for resetting a bit in the bit file allocation table when the reanalysis of said entry is indicative of a valid entry.

7. The apparatus of claim 6, wherein the repair module zeros out said entry when the analysis of said entry is indicative of an invalid entry.

8. A computer-readable storage medium containing a computer program that comprises:

a repair module for repairing an entry of a compressed file allocation table when an analysis is indicative of an invalid entry, said entry being indicative of a corresponding compressed volume file stored in an external storage medium, and a diagnostic module for detecting in each entry at least one invalid condition, said invalid condition being from the group of invalid conditions comprising a first invalid condition indicative of a range error in said entry, and a second invalid condition indicative of a cross-link error between at least two of said entries, for setting a bit in a bit file allocation table when the analysis of said entry is indicative of a valid entry, for performing a reanalysis of each entry in the compressed file allocation table, and for resetting a bit in the bit file allocation table when the reanalysis of said entry is indicative of a valid entry, each bit of the bit file allocation table being indicative of a portion of the external storage medium corresponding to a location of said compressed volume file in the external storage medium.

* * * * *

UNITED STATES PATENT AND TRADEMARK OFFICE
CERTIFICATE OF CORRECTION

PATENT NO.   : 5,781,722

DATED        : July 14, 1998

INVENTOR(S)  : David M. Buches

It is certified that error appears in the above-identified patent and that said Letters Patent is hereby corrected as shown below:

Title page, item [75], Inventor: should read --David M. Buches, Woodland Hills, Calif.--.

Signed and Sealed this

Tenth Day of November 1998

Attest:

BRUCE LEHMAN

Attesting Officer

Commissioner of Patents and Trademarks